US009507661B2

(12) United States Patent
Breuninger et al.

(10) Patent No.: US 9,507,661 B2
(45) Date of Patent: Nov. 29, 2016

(54) BUS SYSTEM HAVING A MASTER AND A GROUP OF SLAVES AND COMMUNICATION METHOD FOR INTERCHANGING DATA IN SAID BUS SYSTEM (75) Inventors: Matthias Breuninger, Stuttgart (DE); Thomas Handte, Filderstadt (DE); Hanns Thilo Hagmeyer, Geislingen/Steige (DE)

(73) Assignee: AS-INTERNATIONAL ASSOCIATION E.V., Gelnhausen (DE)

( * ) Notice: Subject to any disclaimer, the term of this patent is extended or adjusted under 35 U.S.C. 154(b) by 631 days.

(21) Appl. No.: 14/002,139

(22) PCT Filed: Feb. 27, 2012

(86) PCT No.: PCT/EP2012/000839
§ 371 (c)(1),
(2), (4) Date: Oct. 9, 2013

(87) PCT Pub. No.: WO2012/116801
PCT Pub. Date: Sep. 7, 2012

(65) Prior Publication Data
US 2014/0025854 A1 Jan. 23, 2014

(30) Foreign Application Priority Data

Mar. 1, 2011 (DE) .......................... 10 2011 012 766
May 5, 2011 (EP) ...................................... 11003691

(51) Int. Cl.
*H04J 4/00* (2006.01)
*G06F 11/10* (2006.01)
(Continued)

(52) U.S. Cl.
CPC ........... *G06F 11/10* (2013.01); *G05B 19/0423* (2013.01); *G06F 13/364* (2013.01);
(Continued)

(58) Field of Classification Search
USPC .......................... 370/436, 488, 489; 710/110
See application file for complete search history.

(56) References Cited

U.S. PATENT DOCUMENTS 2,819,344 A * 1/1958 Thompson ................ H04J 1/18
370/480
3,488,445 A * 1/1970 Chang ................. H04L 27/2601
333/173

(Continued)

FOREIGN PATENT DOCUMENTS

DE          10032533 A1      1/2002
JP          2003-008539 A    1/2003

(Continued)

*Primary Examiner* — Paul R Myers
(74) *Attorney, Agent, or Firm* — Hultquist, PLLC; Peter H. Priest (57) ABSTRACT The invention relates to a bus system having a master and a group of slaves connected thereto via a bus and to a communication method for interchanging data between the master and slaves in such a bus system. At least one communication frequency is associated with each slave in the group. The master places transmission data at different communication frequencies onto the bus in transmission phases. Each slave in the group reads in and processes those transmission data which have been placed onto the bus by the master at a frequency corresponding to the, or a, communication frequency associated with this slave and ignores and rejects those transmission data which have been placed onto the bus by the master at a frequency corresponding to a communication frequency associated with another slave in the group, with the result that each slave in the group can be individually addressed by the master by virtue of the fact that transmission data are transmitted from the master to each of the slaves in the group at that communication frequency which has been associated with said slave.

27 Claims, 5 Drawing Sheets (51) Int. Cl.
  *G05B 19/042* (2006.01)
  *H04L 5/00* (2006.01)
  *H04L 5/06* (2006.01)
  *G06F 13/364* (2006.01)

(52) U.S. Cl.
  CPC ........... *H04L5/0007* (2013.01); *H04L 5/0037* (2013.01); *H04L 5/06* (2013.01); *G05B 2219/25136* (2013.01)

(56) References Cited

U.S. PATENT DOCUMENTS

| | | | | |
|---|---|---|---|---|
| 3,806,838 A | * | 4/1974 | Kitazume | H01P 9/00 333/136 |
| 3,809,816 A | * | 5/1974 | Reed | H04Q 11/02 370/295 |
| 4,041,393 A | * | 8/1977 | Reed | H04B 7/2643 370/341 |
| 4,075,427 A | * | 2/1978 | Mattsson | H04L 5/143 370/206 |
| 4,328,581 A | * | 5/1982 | Harmon | H04B 17/309 340/7.43 |
| 4,402,076 A | * | 8/1983 | Krajewski | H04J 1/04 370/295 |
| 4,633,411 A | * | 12/1986 | Bliss | H04B 17/309 702/77 |
| 4,646,295 A | * | 2/1987 | Basile | H04M 9/027 370/488 |
| 4,701,911 A | * | 10/1987 | Ulug | H04L 12/407 370/453 |
| 4,770,842 A | * | 9/1988 | Kelly | G08C 15/04 376/216 |
| 5,052,024 A | * | 9/1991 | Moran, III | H04B 7/01 370/295 |
| 5,077,816 A | * | 12/1991 | Glomb | H01S 5/0687 372/108 |
| 5,321,540 A | * | 6/1994 | Takai | H04J 14/02 398/1 |
| 5,410,729 A | * | 4/1995 | Kumagai | H03G 3/3052 330/254 |
| 5,487,066 A | * | 1/1996 | McNamara | H04L 12/2801 370/410 |
| 5,593,430 A | * | 1/1997 | Renger | A61N 1/36585 607/18 |
| 6,014,719 A | * | 1/2000 | Zhou | H04L 5/06 710/104 |
| 6,141,351 A | * | 10/2000 | Goodnow | H04Q 11/0478 370/449 |
| 6,344,921 B1 | * | 2/2002 | Galvanauskas | H04B 10/291 359/328 |
| 6,359,871 B1 | * | 3/2002 | Chung | H04W 88/085 370/338 |
| 6,741,551 B1 | * | 5/2004 | Cherubini | H04L 5/1438 370/210 |
| 6,975,585 B1 | * | 12/2005 | Olafsson | H04L 5/023 370/206 |
| 7,177,288 B2 | * | 2/2007 | Mooney | H04L 5/1423 326/30 |
| 7,280,564 B1 | * | 10/2007 | Geile | H04L 27/2652 370/507 |
| 2001/0047491 A1 | * | 11/2001 | Indefrey | H04L 12/12 713/320 |
| 2002/0034159 A1 | * | 3/2002 | Greaves | H04L 5/143 370/208 |
| 2002/0076143 A1 | * | 6/2002 | Foltzer | H04B 10/032 385/24 |
| 2002/0186715 A1 | * | 12/2002 | Mestdagh | H04B 3/542 370/480 |
| 2003/0103445 A1 | * | 6/2003 | Steer | H04L 5/143 370/208 |
| 2004/0151109 A1 | * | 8/2004 | Batra | H04B 1/7163 370/208 |
| 2004/0223554 A1 | * | 11/2004 | Cha | H04L 27/2675 375/260 |
| 2005/0013320 A1 | * | 1/2005 | Binder | H04B 3/54 370/463 |
| 2005/0105477 A1 | * | 5/2005 | Binder | H04L 12/2803 370/254 |
| 2006/0126617 A1 | * | 6/2006 | Cregg | H04B 3/542 370/389 |
| 2007/0064783 A1 | * | 3/2007 | Kuroda | H04W 16/10 375/222 |
| 2009/0132748 A1 | * | 5/2009 | Sheffield | H04L 12/40 710/307 |
| 2009/0238293 A1 | * | 9/2009 | Bhatti | H04L 1/1614 375/260 |
| 2009/0279626 A1 | * | 11/2009 | Wang | H04L 1/0025 375/260 |
| 2011/0200056 A1 | * | 8/2011 | Diab | H04L 43/0882 370/463 |

FOREIGN PATENT DOCUMENTS

| | | |
|---|---|---|
| JP | 2003-196230 A | 7/2003 |
| JP | 2008-193666 A | 8/2008 |
| WO | WO 2010/116910 A2 | 10/2010 |

\* cited by examiner

BUS SYSTEM HAVING A MASTER AND A GROUP OF SLAVES AND COMMUNICATION METHOD FOR INTERCHANGING DATA IN SAID BUS SYSTEM

TECHNICAL FIELD

The present invention refers to a bus system having a master and at least one group of slaves connected in parallel with to said master via a bus. The present invention refers also to a communication method for interchanging data between a master and at least one group of slaves connected in parallel to said master via a bus in a bus system, especially an AS-i bus system, comprising said master, said slaves and said bus.

PRIOR ART

In a conventional actor-sensor interface bus system (abbreviation: AS-i bus system), a master has a plurality of slaves connected thereto via a two-wire bus. Said bus serves not only for the communication between master and slaves, but also for supplying voltage to said master and said slaves via the same lines. In order to communicate with said slaves, the master goes through transmit phases, so-called downlink phases, during which it transmits data to and therefore addresses said slaves, as well as receive phases, so-called uplink phases, during which it receives data (messages) from said slaves, in a continuous cycle. In conventional AS-i bus systems, a complete bus cycle is typically 5 . . . 10 ms. The time required for completing a bus cycle is referred to as cycle period.

During each receive phase, the master addresses each individual slave via said bus. Here, the slaves are addressed subsequently by an individual identifier, that is the slave address transmitted by the master; the data subsequent to each identifier, which may e.g. comprise commands or parameters, are only read in and processed by the slave addressed specifically by said identifier, while all other slaves, which are not addressed by said identifier, will ignore said data or will not respond to the same or will discard the same. That is, each slave recognizes from said identifier if it is actually addressed or not. Therefore, each slave receives data via said bus during a receive phase, which data are specifically intended for and are preceded by an identifier of said slave. By means of said identifier, the addressed slave recognizes that the subsequent data are intended for said slave. Subsequently, the master transmits the next identifier for the next slave, followed by data for the same slave, and so on, via said bus.

In this way, the master is able to address and provide with data each slave individually, although all slaves are parallel connected to said master via said bus. During each transmit phase, each slave is addressed exactly once. According to this principle, the master never addresses more than one slave at a time during said transmit phase, but never more than one slave nor in a temporally overlapping manner.

During said receive phase, the master will receive responses of the individual slaves. During each receive phase, each slave provides one message for responding to the master. Said message consists of an individual identifier of said slave and of data which may comprise status messages or data measured by a sensor connected to said specific slave. Here, the messages of the individual slaves are provided successively during each receive phase so that the individual message do not overlap. According to this principle, the master never receives more than one slave's response at a time during said receive phase, but never messages of more than one slave nor in a temporally overlapping manner.

That is, each slave message occupies only a portion of the receive phase; said portion will be referred to as "output phase" of the corresponding slave. The data transmitted by said slave will be referred to as "output sets of data".

Prior art AS-i bus systems are for example described in a textbook with the title "ASI: Das Aktuator-Sensor-Interface für die Automation", Ed. W. Kreisel and O. Madelung, Carl Hanser Verlag München Wien, 1994, ISBN 3-446-17825-2.

A disadvantage of said conventional communication principle established in the prior art is, that only a relatively short time slot is provided during the transmit phase as well as the receive phase for each slave communicating with said master, since the slaves share said transmit phase as well as said receive phase. That is, in a bus system having e.g. the typically highest possible number of 62 slaves, each slave is provided with only a fraction of time in each bus cycle. As a result thereof, the amount of data interchanged between master and slave during each bus cycle is limited to a relatively small amount of data, which has often negative effects and is therefore undesirable. The word length, for example, is limited of 4 bits.

This problem could only be addressed if the transmit phase and the receive phase, and therefore the bus cycle period, were extended. However, this has the disadvantage that the time interval between two messages of one slave is extended and therefore the response time of said bus system is longer, e.g. in a case where one of said slaves puts out a warning message. In practice, it is often essential to have a short reaction time of a bus system. This may especially be the case if time-critical safety devices monitored by slaves are affected. In these instances, the above disadvantage is very grave and often excludes an elongation of cycle period. On the other hand, there are many cases where a reduction of response interval of a bus system is desired.

Moreover, an extension of bus cycle period would also mean fewer bus cycles per second, so that the amount of communication data could be increased per bus cycle, but not per time unit. Another disadvantage of conventional AS-i bus systems is the limitation of the number of slaves to be implemented therein to a number of 62, as already mentioned.

TECHNICAL PROBLEM

The problem underlying the invention is therefore to provide a bus system having a master and a group of slaves, and a communication method for interchanging data in such a bus system, which enable a considerably larger amount of data to be interchanged between said master and said slaves and/or a considerably shorter reaction time of said bus system and/or furthermore the implementation of more than 62 slaves, e.g. the implementation of 128 slaves.

DISCLOSURE OF THE INVENTION AND ADVANTAGES

[A1] According to the present invention, the above problem is solved by a communication method for interchanging data between a master and at least one group of slaves connected in parallel to said master via a bus in a bus system comprising said master, said slaves and said bus, characterized by the following steps:

a) each slave is assigned at least one communication frequency, b) the master goes through transmit phases during which it loads various transmission data onto said bus at different communication frequencies, c) each slave of said group reads in and processes transmission data loaded by said master onto said bus at a frequency corresponding to the at least one communication frequency assigned to said slave in step a) and ignores or discards transmission data loaded by said master onto said bus at a frequency which does not correspond to at least one of its assigned communication frequencies.

Therefore, all slaves are able to be addressed parallel and at the same time. The reaction time is shortened.

As a result thereof, each slave of said group can be individually addressed by the master, and said master therefore transmits transmission data onto said slave at at least one of said communication frequencies assigned to said slave via said bus. Therefore, all slaves are able to be addressed parallel and at the same time. The reaction time is shortened.

[A17] The problem is further solved by a bus system having a master and at least one group of more than one slaves connected to said master via a bus, wherein at least one communication frequency is assigned or is able to be assigned to each slave of said group, said master is able to go through transmit phases during which it loads various transmission data onto said bus at different communication frequencies, each slave of said group is able to read in and process transmission data which said master loads onto said bus at a frequency corresponding tp the at least one communication frequency assigned to said slave and ignore or discard transmission data which said master loads onto said bus at a frequency not corresponding to at least one of its assigned communication frequencies.

As a result thereof, each slave of said group can be addressed individually by said master. Since this is also the case with all other slaves, the word length may be increased, e.g. to 64 bits.

Specifically, it is possible for the respective slave to read in transmission data not intended for the slave, but it will ignore or immediately discard the same, e.g. by erasing the same from its memory, instead of processing the same.

The group of slaves may comprise all slaves connected to said bus or only a portion of said slaves connected to said bus. In particular, two or more groups of slaves may be connected to said bus, in which case steps a), b) and c) are executed separately for each group. In this case, the groups may be addressed successively by means of e.g. a respective group identifier. The assignment performed in step a) may be cancelled before proceeding to a respective next group.

Preferably, any two slaves will not be assigned the same communication frequency, i.e. it is preferred to not assign a communication frequency assigned to a slave in said group to any other slave in said group.

[A18] In a bus system according to the invention it is preferred to not assign one communication frequency to any two slaves.

The transmission data form sets of transmission data. Each set of transmission data is loaded by the master onto said bus at a specific communication frequency and is intended for an individual specific slave. The slave determines the communication frequency of the sets of data loaded onto said bus. The slave recognizes sets of transmission data arriving via the at least one communication frequency assigned to the slave by means of said communication frequency as sets intended for the slave; and reads in and processes the same. The slave recognizes sets of transmission data arriving via the at least one communication frequency assigned to the slave by means of said communication frequency as sets intended for the slave; and reads in and processes the same. That is, no slave will respond to commands in transmission data not assigned to the slave. According to the invention, each slave recognizes if transmission data are intended for the slave or not by means of the communication frequency at which said transmission data arrive at said bus. Therefore, the communication frequency operates as an identifier of the slave for which the transmission data loaded onto said bus are intended. Therefore it is not necessary to include an identifier comprised of a digital slave address as receiver identification in said transmission data, and as a result thereof, system capacity is unlocked during data transfer.

[A19] According to one embodiment of the inventive bus system, the master is able to load transmission data at different communication frequencies onto said bus at the same time or in a temporally overlapping manner and therefore to transmit transmission data to all slaves in one group or to a plurality of slaves in one group at the same time or in a temporally overlapping manner.

[A19] During transmit phases, the master preferably loads transmission data at different communication frequencies onto said bus at the same time or in a temporally overlapping manner and therefore transmits transmission data to all slaves of a group or to a plurality of slaves of a group at the same time or in a temporally overlapping manner.

That means that the slaves of a group will preferably receive transmission data from said master not successively, as in the prior art, but at the same time or at least in a temporally overlapping manner. According to the invention, the master is therefore able to transmit in parallel transmission data to each slave in a group, which data are, however, intended only for a specific slave and will only be read in and processed by said specific slave, but ignored or discarded by the other slaves in said group.

As a result thereof and contrary to the state of the art, each slave is not provided with only a portion of a transmit phase or downlink phase, respectively, for data communicating from master to slave, but on the basis of the present invention, each slave of a group is able to use the entire transmit phase or downlink phase, respectively, in a non-time-divided manner; communication frequencies not just fractions of a transmit phase, are distributed to the individual slaves. Advantageously, the amount of transmission data which can be transmitted from the master to each slave of a group per bus cycle is increased with respect to the state of the art, e.g. from a word length of 4 bits to a word length of 64 bits.

Alternatively, the duration of the downlink phase can be reduced to a fraction of that of the prior art without reducing the amount of transmission data transmitted from master to slaves per bus cycle, which is of considerably advantage, since in this way, the duration of the bus cycle period, and therefore the response time of the bus system, can be shortened with respect to the prior art without a loss of transmission data capacity per bus cycle.

The present invention is able to realize the above improvements, since according to the invention each slave of a group is addressed via at least one communication frequency assigned to the slave in step a), and no slave of said group processes transmission data loaded by the master onto the bus at a communication frequency dedicated to another slave, which enables a parallel communication of said master and said slaves of a group.

According to a modification of the present invention having a further increased transmission data transfer capacity per slave, each slave of a group has two or more communication frequencies assigned thereto in step a), the master transmitting in parallel transmission data at said two or more communication frequencies assigned to said slave, so that the transfer of transmission data from the master to each slave of said group takes place on two or more parallel channels, each of which is characterized by a communication frequency assigned to said slave in step a). According to a sub-variant of the above, the same transmission data are transferred via these channels leading to a slave, such that the transmission data transfer to said slave takes place redundantly via two or more channels, and as a result thereof, an interference resistance and a reliability of the transmission data transfer is enhanced.

According to another sub-variant, different transmission data are transmitted via these channels leading to a slave, and as a result thereof, the bit rate or the data transmission rate, respectively, of the transmission data transfer from master to slave is increased.

[A20] The bus system according to the present invention may be configured such that each slave of a group is able to go through output phases during which it loads sets of output data onto the bus at at least one frequency which corresponds to said at least one communication frequency assigned to said slave, and the master is able to read in said sets of output data loaded onto the bus by said slaves, and to assign each set of output data via its at least one communication frequency to the slave of the group which has been assigned with this at least one communication frequency. [A3] According to a very advantageous variant of the communication method according to the present invention, the further steps are additionally performed:

d) each slave of a group goes through output phases when it will load sets of output data onto said bus at at least one such frequency corresponding to the at least one communication frequency assigned to said slave in step a), e) the master reads in sets of output data which have been loaded onto said bus by said slaves in step d), the master assigning each set of output data to the slave in said group which has been assigned with a communication frequency in step a) by means of this communication frequency. According to the invention, the master will therefore recognize which output data originate from which slave by means of the communication frequency at which said output data arrive at the bus. That means that according to this variant, the communication frequency serves as an identifier of a slave, that is in this case to identify the slave which has sent the respective set of output data, even with a data transmission from slaves to master. Therefore it is not necessary to include an identifier comprised of a digital slave address as sender identification in said sets of output data, and as a result thereof, system capacity is unlocked. Preferably, transmit phases and output phases or receive phases, respectively, do not temporally overlap; in this case the same communication frequencies may be used in transmit and receive phases. In case of different frequencies of the parties communicating in the downlink and in the uplink, the transmit and output phases may even overlap.

[A5] According to a preferred variant of the method according to the present invention, the master loads transmit data onto the bus only during transmit phases, and receives, reads in and optionally processes sets of output data only during receive phases. Therefore, the sets of data have a fixed frame structure.

[A22] A preferred embodiment of the bus system according to the present invention is characterized by the fact that the master transmits transmission data only during the transmission phases and receives, reads in and optionally processes sets of output data only during output phases.

A preferred variant of the bus system is characterized by the fact that the output phases of all slaves of the group overlap or coincide temporally, and as a result thereof, sets of output data of different slaves of a group will be loaded onto the bus in a temporally overlapping or coinciding manner and therefore arrive in a temporally overlapping or coinciding manner at the master.

The master being able to receive, read in and optionally process sets of output data from different slaves of a group at different communication frequencies in a temporally overlapping or coinciding manner and to assign each read-in set of output data to a specific slave of said group by means of the communication frequency of said set of output data, and to interpret and process it accordingly.

[A4] Specifically, the output phases of all slaves of the group may temporally overlap or coincide, such that sets of output data from different slaves of the group at different communication frequencies are loaded onto the bus in a temporally overlapping or coinciding manner and therefore arrive at the master in a temporally overlapping or coinciding manner, wherein said master receives sets of output data from different slaves of the group at different communication frequencies in a temporally overlapping or coinciding manner, reads them in and assigns each set of output data to a specific slave of the group by means of the communication frequency. That means that the slaves of a group will preferably not register at the master one after the other as in the prior art, but at the same time or at least in a temporally overlapping manner. According to the invention, the master can therefore receive output data from each slave of a group in parallel.

As an advantageous result thereof, each slave is not provided with only a fraction of the uplink phase for transmitting data from the slaves to the master as in the prior art, but instead the entire uplink phase is made available in a non-time-divided manner for transmitting data from each slave of a group to the master according to the invention. In this manner, the amount of transmission data transmitted to the master from each slave of a group is multiplied.

Alternatively, the duration of the uplink phase may be reduced to a fraction with respect to the prior art for the same amount of output data to be transmitted per bus cycle, which has again the advantageous result that the response time of the bus systems can be further considerably shortened.

This marked improvement is possible according to the present invention, since according to the present invention, each slave of a group transmits sets of output data to the master at a communication frequency assigned in step a), and the master recognizes the senders of all sets of output data by means of said communication frequency at which said sets of output data arrive.

According to the invention, the downlink phases and the uplink phases, and therefore the length of the bus cycle period and in particular also the response time of the bus system, can by dramatically shortened without forfeiting an amount of transmission data to be transferred, or even with an increase of an amount of transmission data to be transferred, which is an essential advantage of the present invention.

According to the present invention, bus cycle periods of e.g. 1 ms or less can be realized, as compared to typically 5 . . . 10 ms in conventional AS-i bus systems. This means a response time of the inventive bus system which is shortened e.g. by a factor of 5 . . . 10 with respect to the prior art. According to a variant of the present invention, which has a further increased transmission data transfer capacity, each slave of a group has two or more communication frequencies assigned thereto in step a), each slave transmitting to the master transmitting in parallel sets of output data at said two or more communication frequencies assigned to said slave, so that the transfer of sets of output data to the master takes place on two or more parallel channels, respectively, each of which is characterized by a communication frequency assigned to said slave in step a). In other words: In each bus cycle, the frame structure of the communication includes a learning frequency where the channels or frequencies, respectively, are negotiated between master and slave.

According to a sub-variant of the above, the same sets of output data are transferred via each of said parallel channels leading from slave to master, and as a result thereof, the interference resistance and reliability of the output data transfer is increased.

According to another sub-variant, different transmission data are transmitted via these parallel channels which lead to a slave, and as a result thereof, the bit rate or the data transmission rate, respectively, of the transmission data transfer from master to slave is increased.

According to a variant of the present invention, each slave of a group can only be addressed by transmission data which are transmitted at its own assigned communication frequency. According to another variant of the present invention, each slave of a group can also be addressed by transmission data which are transmitted at one or more specific additional frequencies.

[A23] According to an advantageous variant of the bus system, the master is able to go through at least one additional transmit phase during which it loads additional transmission data onto the bus at at least one specific additional frequency, wherein all slaves of a group are able to read in and process additional data loaded by the master onto the bus at at least one additional frequency, such that all slaves of the group can be addressed by said master by means of the transmission data transmitted at the one or more additional frequencies, even if said slaves have no communication frequency assigned or not yet assigned.

[A6] According to a very advantageous variant of the present invention, the following process steps are executed:

f) the master goes through at least one additional transmission phase during which it loads additional transmission data at at least one specific additional frequency onto the bus, g) the additional transmission data which are loaded by the master onto the bus at the additional frequency or frequencies in step f) are read in and processed by all slaves of the group, such that all slaves of the group can be addressed by the master by means of the additional transmission data transmitted at said additional frequency or frequencies, even if step a) has not been executed or said slaves has no communication frequency assigned thereto.

Preferably, the additional transmission phase is not a temporally added operating phase, but overlies at least a transmission phase and/or at least an output phase.

[A24] The master is preferably able to assign a communication frequency to each slave of the group by loading data as additional transmission data onto the bus, which data contain information which assign at least one communication frequency to each slave of the group.

[A7] Preferably, said additional transmission data contain information which assign at least one communication frequency to each slave of the group, such that step a) is executed along with the execution of steps f) and g).

The additional transmission phase, also referred to as "broadcast transmission phase" below, preferably serves to supply the slaves of the group with data before assigning a communication frequency to the same, and may especially serve to assign the communication frequencies to the slaves and to execute step a) in this way. To this end, the additional transmission data can include slave identifiers or slave addresses which are used to assign a specific communication frequency to each individual slave and/or which are used to address specific slaves individually with specific data content, that is the additional transmission data can be directed to single slaves or collectively to all slaves of a group at the same time, as required.

The additional transmission phase or broadcast phase, respectively, can furthermore be used to remove, that is cancel, an existing communication frequency assignment to the slaves, for example in order to be able to then conduct another, changed communication frequency assignment to said slaves according to step a) in a further broadcast transmission phase.

The additional transmission phase or broadcast transmission phase may be passed especially during the transmit phase or during the receive phase or may be overlapping the transmit or receive phase. That is, the additional transmit phase can be passed in parallel to the transmit or receive phase, respectively.

According to a preferred variant, additional transmission data are transmitted to the slaves at two or more additional frequencies in parallel and are read in by said slaves in steps f) and g). In this way, a higher speed and/or redundancy and therefore a lower possibility of transmission errors can be achieved when transmitting additional transmission data. If the quality of connection is monitored, the communication frequencies may be changed automatically in order to achieve a better connection.

Preferably, not every bus cycle includes an additional transmit phase. Similarly, one or more additional receive phases or additional output phases, also referred to as broadcast receive phases or broadcast output phases, respectively, may be provided, during which the slaves are able to transmit data to the master outside of said communication frequencies. According to another advantageous variant of the bus system, the slaves of a group are therefore able to go through at least one additional output phase, also referred to as broadcast output phase, during which they transmit sets of broadcast output data to the master at at least one broadcast frequency. In particular, the sets of broadcast output data can receive slave responses to commands which the slaves have received from the master during the broadcast transmission phase. According to a preferred variant of the present invention, the broadcasting frequency at which the sets of output data are transmitted is identical to the additional frequency at which the additional transmission data are transmitted, the broadcast transmission phases and broadcast output phases being not overlapping in this case.

The additional transmit phase and the additional output phases provide at least one additional communication channel, or broadcast channel, between the master and the slaves, which is independent from the data exchange via the communication frequencies.

Preferably, the slaves only put out sets of broadcast output data if they have been prompted to do so by the master. Preferably, not every bus cycle includes broadcast output phases. It is not necessary to transmit data via the broadcast channel or channels during each broadcast transmit phase or during each broadcast output phase.

The broadcast transmit phase and the broadcast output phases may be used especially to interchange control data, to boot the bus system or keep it running, and to carry out step a). It is also of advantage to carry out a communication synchronization via this channel.

[A25] According to a variant of the bus system, the assignment of at least one communication frequency to each slave of a group may be executed as described below: the master addresses a first slave in the group by transmitting on the bus an identifier included in the additional transmission data the master executes at least one test communication with the first slave at different test frequencies, the associated signal-to-noise ratio or the associated bit error rate is determined for each test communication, of all tested frequencies which have not yet been assigned to a slave as a communication frequency, the test frequency which provided the highest signal-to-noise ration or the lowest bit error rate is assigned as a communication frequency to the first slave, this procedure is repeated accordingly for the other slaves in the group. In other words, channels are negotiated in this way during a learning frequency.

[A8] According to a preferred variant of the present invention, step a) is carried out as described below:

a) in step f) the master addresses a first slave in the group by sending an identifier included in the additional data over the bus, a2) the master carries out at least one test communication with the first slave at each one of a plurality of test frequencies, a3) the signal-to-noise ratio or the bit error rate associated with each test communication is determined, a) of all test frequencies used in step a), which have not been assigned to a slave as communication frequency, the test frequency which achieved the highest signal-to-noise ratio or the lowest bit error rate in step a) is assigned as communication frequency to the first slave, a5) steps a1)-a4) are repeated accordingly for the other slaves in the group. Steps a1) to a5) therefore include an optimization of communication frequencies. Channels which have been negotiated in this manner provide the smallest error margin.

However, conditions during data transmission often change with time, for example due to changes of the outside temperature or due to the bus system's exposure to variable electromagnetic interference fields. In case of non-stationary slaves, e.g. slaves mounted to a movable robot or slaves connected to a movable robot by a flexible cable, or slaves which move along a metal rail which they tap using a pickup shoe), the transmission conditions may change also due to varying line geometry.

However, altered transmission conditions may detrimentally affect the signal-to-noise ratio or the bit error rate. It is therefore preferred if the optimization tracks the transmission conditions by canceling the assignment between communication frequency and slaves and repeating steps a1) to a5) in regular time intervals. According to another variant, the assignment between communication frequencies and slaves is cancelled and steps a1) to a5) are repeated, if a signal-to-noise ratio (SNR) of the communication with at least one slave has fallen below a specific critical value. In this ways the variable transmission conditions can be responded to in a compensating way.

According to one variant, the bus system includes not just one, but two or more groups of slaves, wherein the inventive method described above is first carried out for a first one of said groups, then for the second one of said groups, and so on. Especially steps a) to c) may be carried out successively and separately for each group. Here, it is preferred to cancel all earlier assignments between slaves and communication frequencies, i.e. those made during a preceding step a), before any step a) is performed for a group, in order to prevent an assignment of the same communication frequency to two or more slaves at any point in time. According to this variant, not more than one group of slaves, if any, communicates with the master at one point in time, that is the group which is "active" at this point in time. The other groups of slaves, if any, are "inactive" at this point in time, that is none of their slaves has a communication frequency assigned, and no slave of a "inactive" group reads in any transmission data, or the slaves of a "inactive" group ignore or discard said transmission data.

Moreover, it is preferred if the slaves are programmed to not load any output data on the bus if they have no communication frequency assigned, that is, if they belong to a "inactive" group. In this way, the uniqueness of the receiver of transmission data as well as the uniqueness of the sender of transmission date can be ensured even in case of a plurality of groups of slaves. According to a variant of the present invention, each slave of a group can only be addressed by transmission data which are transmitted at its own assigned communication frequency. According to another variant of the present invention, each slave of a group can also be addressed by transmission data which are transmitted at one or more specific configuration frequencies. According to another variant of the present invention, each slave of a group can also be addressed by transmission data which are transmitted at one or more additional frequencies.

[A26] According to a variant of the inventive bus system, the following steps may be executed: h) the master goes through at least one configuration transmission phase during which it loads configuration data of at least one specific configuration frequency onto the bus, i) all slaves connected to the bus read in and process the communication data loaded onto the bus by the master in step h), such that each slave connected to the bus may be addressed by the master by means of the configuration data transmitted at the configuration frequency or frequencies, wherein said configuration data contain information which i) cancel the assignment between the slaves of the group and the communication frequencies made in step a), if step a) has already been executed, and i) assign at least one communication frequency to each slave of another group of slaves, k) step b) is continued to be performed, l) each slave of the other group reads in and processes transmission data which are transmitted by the master at such a frequency which corresponds to the at least one communication frequency assigned to that slave in step i), and ignores or discards transmission data which are transmitted by the master at a frequency which corresponds to one of the at least one communication frequencies assigned to another slave of the other group, such that each slave of the other group can be individually addressed by the master in such a way that the master transmits transmission data to the slave at at least one of the communication frequencies assigned to the latter via the bus, such that the transmission of transmission data from the master to each slave of the other group takes place at the at least one communication frequency assigned to said slave in step i),

[A9] According to a variant of the present invention, the following process steps are executed:

h) the master goes through at least one configuration transmission phase during which it loads configuration data at at least on specific configuration frequency onto the bus, i) all slaves connected to the bus read in and process configuration data loaded onto the bus by the master in step h), such that each slave connected to the bus may be addressed by the master by means of the configuration data transmitted at the configuration frequency or frequencies, wherein the configuration frequencies contain data which 11) cancel the assignment between the slaves of said group and the communication frequencies made in step a), if step (a) has already been carried out, and 12) assign at least one communication frequency to each slave of another group of slaves, k) step b) is continued to be performed, l) each slave of the other group reads in and processes transmission data which are transmitted by the master at such a frequency which corresponds to the at least one communication frequency assigned to that slave in step i), and ignores or discards transmission data which are transmitted by the master at a frequency which corresponds to one of the at least one communication frequencies assigned to another slave of the other group, such that each slave of the other group can be individually addressed by the master in such a way that the master transmits transmission data to the slave at at least one of the communication frequencies assigned to the latter via the bus, such that the transmission of transmission data from the master to each slave of the other group takes place at the at least one communication frequency assigned to said slave in step i), Step i1) means that step a), if it has already been carried out for a group of slaves, will undone, which will render said group "inactive". If step a) has not yet been carried out, and there exists no assignment between slaves and communication frequencies, step i1) is unnecessary; it is therefore preferably omitted.

Step i2) means that step a) will be then carried out for the other group of slaves, which will render said other group "active". According to a preferred embodiment of the bus system m) is the master able to go through at least one configuration transmission phase during which it loads configuration data at at least one specific configuration frequency onto the bus, i) are all slaves connected to the bus able to read in and process configuration data loaded onto the bus by the master in step m), such that each slave connected to the bus may be addressed by the master by means of the configuration data transmitted at the configuration frequency. [A10] According to a variant of the inventive method, the following steps may be executed:

m) the master goes through at least one configuration transmission phase during which it loads configuration data at at least on specific configuration frequency onto the bus, n) all slaves connected to the bus read in and process the configuration data loaded onto the bus by the master in step m), such that each slave connected to the bus may be addressed by the master by means of the configuration data transmitted at the at least one configuration frequency,

[A11, A28] Configuration data especially may include information which assign each slave to a group of slaves.

[A29] The master is preferably able to load configuration data onto the bus which assign at least one communication frequency to each slave of a group.

[A12] The further method step described below may in particular be executed:

the master loads configuration data onto the bus, which assign at least one communication frequency to each slave of each group, such that step a) is performed for all groups in this way.

[A13] Preferably, any two slaves of the same group will not be assigned the same communication frequency, i.e. it is preferred to not assign a communication frequency assigned to a slave in said group to any other slave in said group.

[A30] Preferably, any two slaves of the same group will not have the same communication frequency assigned.

[A31] According to a preferred embodiment of the inventive bus system, the mater is able to load configuration data onto the bus which switch one said groups active, such that the slaves of said group may be addressed at the communication frequencies which have been assigned to the slaves of said group, and switch the other groups inactive, such that said groups are not addressable at communication frequencies.

[A14] According to a preferred variant of the inventive method, the following method step may be executed:

p) the mater loads configuration data onto the bus which switch one of said groups active, such that the slaves of said group may be addressed at the communication frequencies which have been assigned to the slaves of said group, and switch the other groups inactive, such that said groups are not addressable at communication frequencies. The configuration data could include information which assign a dedicated, additional frequency to each groups of slaves.

[A15] According to a variant of the present invention, an AS-i bus system or other two-wire bus system is used as the bus system, such that data traffic between master and slaves of a group is transmitted, and power supply to the master and the slaves connected to said bus is effected via said bus.

[A32] Preferably, the bus system is an AS-i bus system or other two-wire bus system, such that data traffic between master and slaves as well as power supply to the master and the slaves connected to said bus take place on said bus. Preferably, OFDM or its basic variant DMT is used for signal transmission. By differential modulation, a great number of communication channels can be established at the same time.

[A16] According to a very advantageous variant of the communication method according to the present invention at least two communication frequencies are assigned to each slave of a group or each slave of at least one group, wherein the master performs one test communication with each slave of the group in certain time intervals, by which it will determine the signal-to-noise ratio or the bit error rate associated with each communication frequency assigned to the slave, and wherein the master will then communicate with the slave at the communication frequency which has been found to have the highest signal-to-noise ratio or the lowest bit error rate.

As already outlined above, the quality of data transmission given during a communication at a communication frequency may vary in time, e.g. due to varying environmental conditions. The latter variant of the inventive method enables switching between different communication frequencies during communications between the master and the slaves, depending on which of the communication frequencies assigned to the respective slave is currently ensuring the best data transmission quality.

According to a very advantageous embodiment of the bus system each slave of a group or each slave of at least one group has at least two communication channels assigned, wherein the master is able to perform one test communication with each slave of a group in certain time intervals, in order to determine the signal-to-noise ratio or the bit error rate associated with each communication frequency assigned to the slave, and wherein the master is able to then communicate with the slave at the communication frequency which has been found to have the highest signal-to-noise ratio or the lowest bit error rate.

[A34] The object is finally reached by a device, especially by a master, a slave, a sensor, an actuator or a monitor for connection to a bus system having a master and at least one group of slaves which are connected to said master in parallel via a bus, which has at least one of a module for transforming a bus signal from a frequency region into a time region, a module for reverse-transforming a signal from the time region into the frequency region, a module for determining a transmission quality of a channel connection, especially a signal-to-noise ratio, a scrambler, a descrambler, a channel encoder, a channel decoder, a differential modulator and a differential demodulator. According to the present invention, those devices are able to communicate with each other in parallel and at the same time, such that data transmission can be effected faster in spite of a larger word length. It is possible to connect significantly more devices to a common bus than in prior automation tasks. These devices may also be connected to a conventional bus and mixed with conventional devices without disturbing each other.

Short description of the drawing schematically illustrated embodiments of the present invention, in which.

Figure 1:
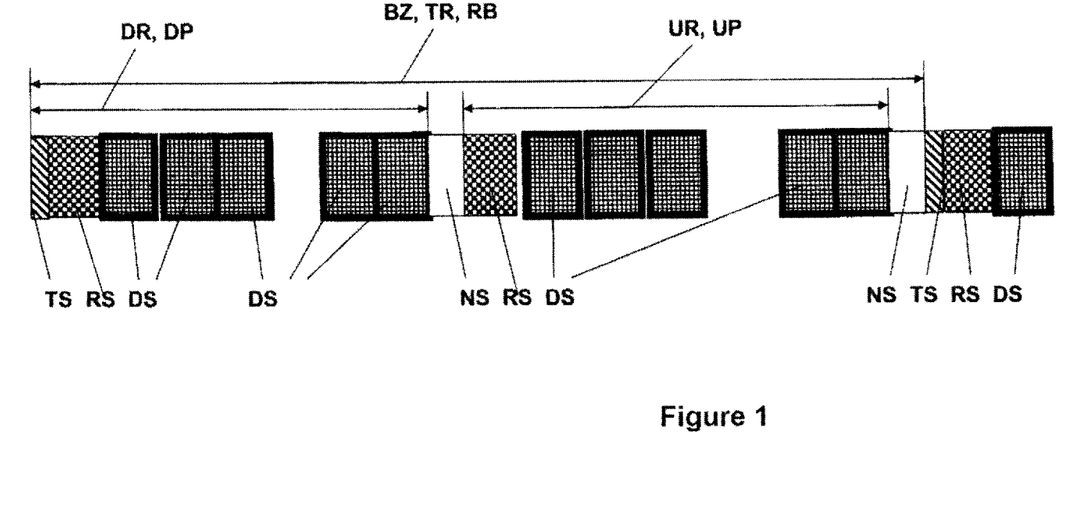
FIG. 1 shows a temporal structure of a transmission signal.

The communication system for the automation technology is based on a switchboard, the master M, and a plurality of participants, the slaves 1, 2, 3. The temporal structure of the transmission signal of this system is configured according FIG. 1. The communication time frame resulting from the bus cycle BZ is determined by the transmission frame RB with a length TR of typically 1 ms. It is synchronized and set by the master. It is divided into a downlink frame DL and an uplink frame UR. Each transmission frame starts with a learning frequency TS which serves to synchronize and negotiate the channels, followed by a reference symbol RS for announcing data transmission. The reference symbol RS is followed by the transmitted data symbols DS. In order to make a division between downlink frames DL and uplink frames UR, a zero symbol NS is transmitted. The subsequent downlink frame DL starts again with a reference symbol RS and ends with a zero symbol NS after transmitting data symbols DS, which also completes the transmission frame RB. Thereafter another transmission frame RB starts with the learning frequency TS, as shown in FIG. 1.

During the downlink phase DP, The master M addresses all slaves in parallel by individual data, and all slaves respond in parallel in turn during the uplink phase UP with individual data. For the data transmission of the point-to-multipoint connection from and to all slaves, an orthogonal multiplex method (OFDM, that is orthogonal frequency-division multiplexing) or its basic band variant discrete multitone transmission (DMT) is used as modulation method. Here, the frequency region is divided into sub-carriers having overlapping partial spectra which are, however, orthogonal and therefore non-interfering with respect to each other. Each slave is assigned one or more sub-carriers for communicating with the master, and as a result thereof, the master is able to address all slaves individually, and the slaves are also able to respond at the same time and individually.

Figure 2:
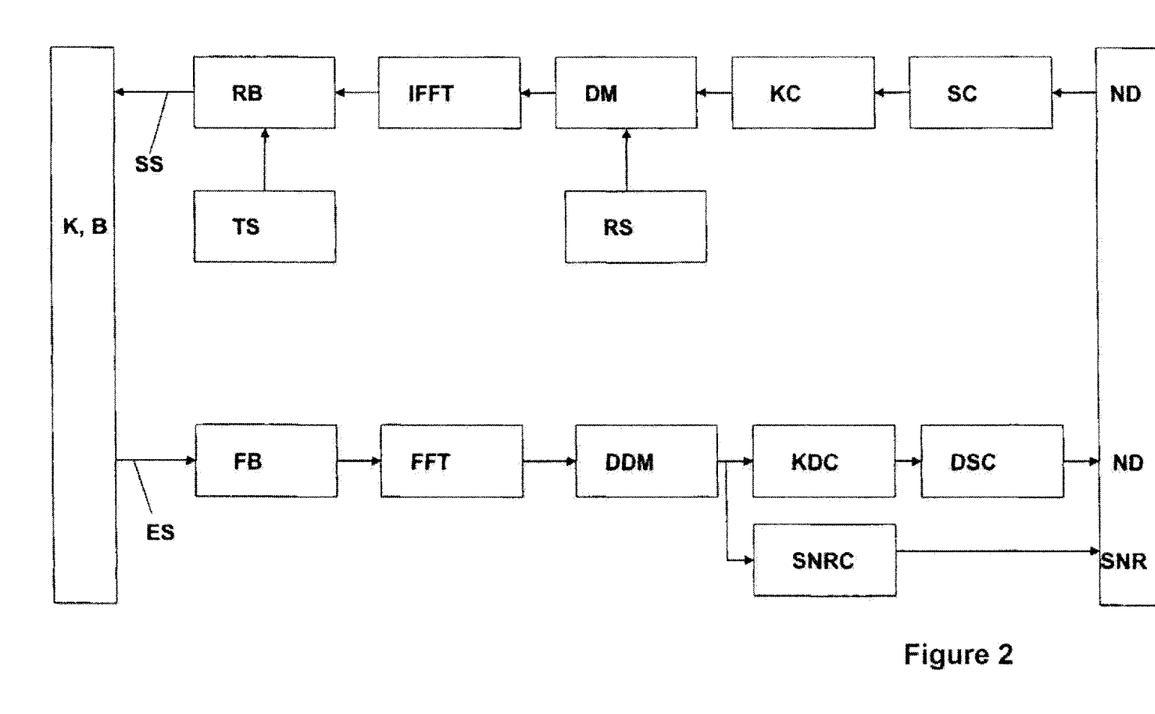
FIG. 2 shows a simplified functional block diagram of a master.

FIG. 2 shows a simplified functional block diagram of the physical layer of a master. The data flow within the transmitting part is shown at the top, the data flow within the receiving part is shown at the bottom. On the left, the physical layer is defined by a bus cable K, and on the right it is defined by device-specific components.

From right to left, the upper signal flow of payload ND passes the following blocks: scrambler SC, channel encoder KC, differential modulation DM, inverse Fast-Fourier transformation IFFT, and transmission frame RB, before the transmission signal SS arrives at cable B. The block for forming the transmission frame RB is also entered by the signal of block TS for forming a learning sequence. That is, a learning sequence is added to the master at the beginning at the transmission frame, such that the slaves are able to detect the beginning of a frame. Another block RS serves to form a reference symbol RS having a signal path which leads to the Differential Modulation block DM. This signal flow therefore determines the downlink frame. During the uplink phase UP, the signal flow of the reception signal ES passes the blocks Windowing FB, Fast-Fourier Transformation FFT, Differential Demodulation DDM, Channel Decoder KDC, Descrambler DSC, from left to right, that is starting from cable B, in order to then be able to pass on the payload ND. After the Differential Demodulation, the signal flow branches off into block SNRS for an SNR estimation which is processed for channel assignment as described above.

Figure 3:
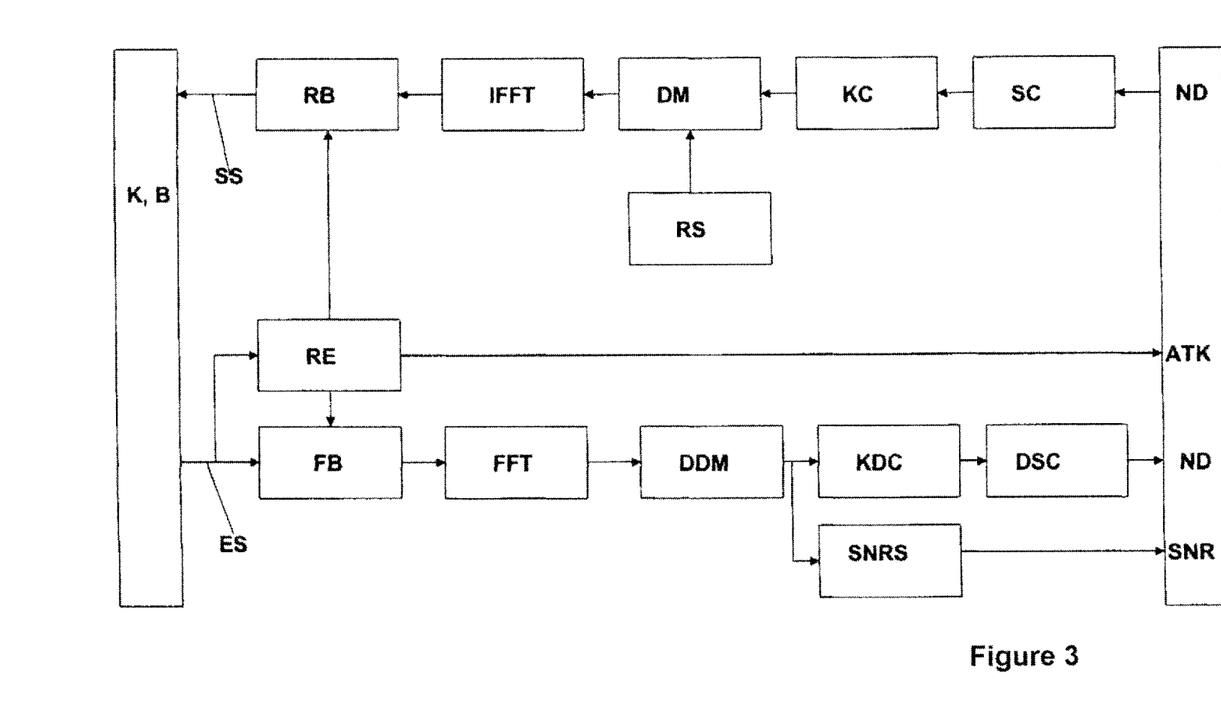
FIG. 3 shows a simplified functional block diagram of a slave.

The structure of the slaves according to FIG. 3 is nearly identical to that of the master. In the slave, the block for forming a learning sequence is omitted. Additionally, a frame identifier block RE is required for the slave to be able to detect the frames and to perform a sampling clock correction. If the start of a frame has been detected, the receive signal ES is transformed by means of a Fast Fourier Transformation performed in Block FFT into the frequency region. The received noisy data of the sub-carrier are then differentially modulated in Block DDM and assigned by means of channel decoding in Block KDC. At the same time, the signal-to-noise ration SNR of the respective sub-carrier is continuously estimated by block SNRS, and a result thereof it is possible to recognize whether said sub-carrier can still be used or whether a new one has to be negotiated. In the receiver, the encoded bit strings of all sub-carriers are differentially modulated (DQPSK) in Block DM, transformed into the time region by IFFT, and transmitted in the corresponding time slot.

Figure 4:
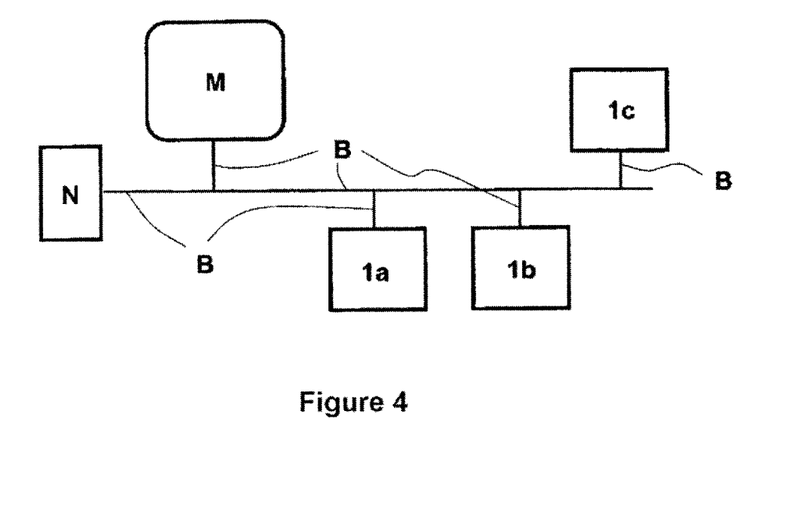
FIG. 4 shows a bus system which can be operated with the inventive communication method.
Figure 6:
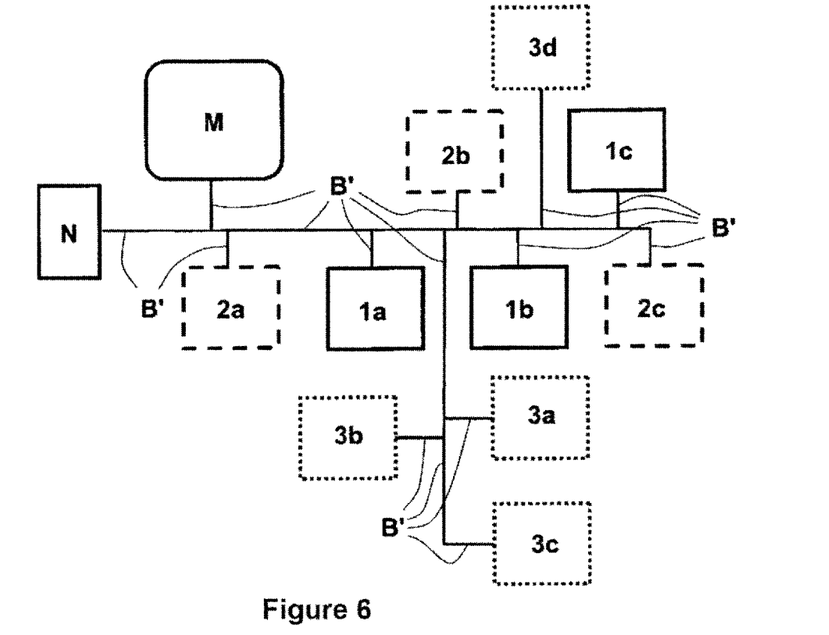
FIG. 6 shows a bus system extended with respect to FIG. 4.

The OFDM method has not been used in the field of automation technology because of the demanding environment, the required very low residual error, i.e. the number of non-recognized bit errors, and the harsh real-time requirements. Meanwhile, the chosen frame structure and the effective error protection mechanisms have made it possible to satisfy these requirements. The preceding learning sequence ensures a synchronization of the slaves to the time intervals set by the master at any time. The differential modulation allows the omission of elaborate and slow channel estimations, and the system responds immediately to a change in channel conditions, e.g. due to the connection of a new slave during operation. The demodulated signal is decoded, and at the same time a quality index is calculated by means of a metric, which index indicates the probability that the decoded bit string is correct. FIG. 4 shows a bus system which can be operated with the inventive communication method, having a bus B, a master M, a power supply N and a group of slaves. Bus B is a two-wire bus with branches. Power supply N, master M and slaves 1a, 1b, 1c are connected to bus B in parallel. Via bus B, master M and slaves 1a, 1b, 1c are supplied with operating voltage supplied by power supply N and fed into bus B. Bus B also serves for establishing data communication between master M and slaves 1a, 1b, 1c. The variant of the inventive communication method described with respect to FIG. 1 serves to exchange data between master M and the group of slaves 1a, 1b, 1c. This structure corresponds also to the conventional AS-i bus system. The circuits of FIG. 4 and FIG. 6 illustrate the flow of the inventive communication method on this structure. This structure can also be incorporated in or combined with existing, conventional bus systems and operated according to the present invention.

In the present example, each slave 1a, 1b, 1c of the group of slaves has assigned at least two communication frequencies. Here, each slave 1a, 1b, 1c of said group has assigned different communication sequences, i.e. no communication sequence is assigned to two different slaves at the same time.

Master M goes through then through transmit phases during which it loads various transmission data onto said bus at different communication frequencies, Each slave of said group reads in and processes transmit data loaded by the master onto bus B at a frequency corresponding to one of said communication frequencies assigned to said slave.

On the other hand, each slave of a group ignores or discards transmit data loaded by the master onto the bus at a frequency corresponding to a communication frequency assigned to another slave of said group.

The transmit data my especially contain commands, so that each slave 1a, 1b, 1c will carry out commands which are loaded by the master onto bus B at a frequency corresponding to one of said communication frequencies assigned to said slave, and will not carry out commands which are loaded by the master onto bus B at a frequency which corresponds to a frequency assigned to another slave of said group. In this way, each slave 1a, 1b, 1c of a group can be addressed individually by master M, since maser M transmits transmit data to said slave via bus B at at least one of said assigned communication frequencies, so that the transmission of transmit data from master M to each of slaves 1a, 1b, 1c of said group is carried out at at least one of said communication frequencies assigned to said slave.

Assignment between slaves 1a, 1b, 1c of a group and communication frequencies can be carried out by a corresponding programming of slaves 1a, 1b, 1c, for example, before the same are connected to bus B.

Figure 5:
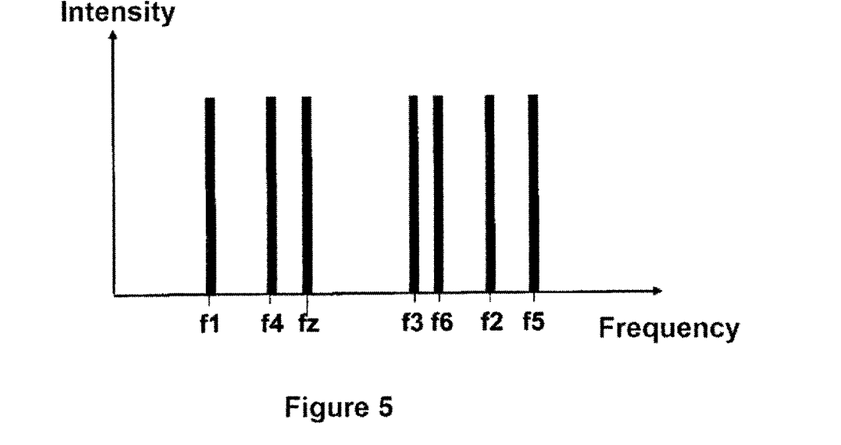
FIG. 5 shows an example of a spectral division of communication frequencies, wherein also an additional frequency is plotted.

According to another preferred variant, master M goes through at least one additional transmit phase in order to make the assignment between slaves 1a, 1b, 1c of a group and communication frequencies, during which phase the master loads additional transmit data onto bus B at a specific additional frequency, said additional transmit data being read in and processed by all slaves 1a, 1b, 1c of said group, such that all slaves 1a, 1b, 1c of said group can be addressed by said master by means of said additional transmit data transmitted at said additional frequency, even if said slaves have not yet been assigned with a communication frequency. in the present example, said additional transmit data contain information which assign each slave 1a, 1b, 1c of said group with at least two dedicated communication frequencies, that is slave 1a with communication frequencies f1 and f2, slave 1b with communication frequencies f3 and f4, and slave 1c with communication frequencies f5 and f6 (FIG. 5). Said frequencies can be in the order of MHz, for example. The negotiated frequencies are kept by the master in a look-up table (cf. table 1) in order to maintain a unique assignment of figures and slaves. For example, each our table can be newly established.

FIG. 5 shows an example of the spectral division of communication frequencies f1-f6 assigned to slaves 1a, 1b, 1c in the above manner. Moreover, the additional frequency illustrated above with respect to FIG. 4 is also plotted on the frequency spectrum of FIG. 2.

Table 1 indicates the assignment between slaves 1a, 1b, 1c and communication frequencies f1, f2, f3, f4, f5 and f6:

TABLE 1

| 'Slave | Communication frequency 1 | Communication frequency 2 |
|---|---|---|
| 1a | f1 | f2 |
| 1b | f3 | f4 |
| 1c | f5 | f6 |

Preferably, the procedure is as follows:

The master carries out one test communication with the first slave 1a at each of communication frequencies f1, f2 at specified time intervals. The associated signal-to-noise ratio or the associated bit error rate is determined for each test communication. Subsequently, the master communicates with slave 1a at the one of communication frequencies f1, f2 which helped to establish the best signal-to-noise ratio or the lowest bit error rate. That is, in case of changing signal-to-noise ratios or bit error rates, switching between frequencies f1 and f2 is performed, if needed, for data traffic from master M to slave 1a. This procedure is also carried out for the other slaves 1b, 1c of said group and the respectively assigned communication frequencies f3, f4 or f5, f6.

FIG. 6 shows a bus system which is extended by two additional groups of slaves 2a, 2b, 2c and 3a, 3b, 3c, 3d with respect to FIG. 1. Bus B' of the bus system in FIG. 3 is extended by supply lines to slaves 2a, 2b, 2c, 3a, 3b, 3c, 3d with respect to bus B of FIG. 1. In the example of FIG. 6, the group of slaves 1a, 1b, 1c, which will be referred to as "first group", is active, while the group of slaves 2a, 2b, 2c, which will be referred to as "second group", and also the group of slaves 3a, 3b, 3c, 3d, which will be referred to as "third group", are both inactive.

Here, a group is referred to as "active", if the slave of said group can be addressed by the master at at least one communication frequency, and a group is referred to as "inactive", if the slaves of said group cannot be addressed by the master at any communication frequency.

According to a preferred variant of the inventive communication method, master M goes through at least one configuration transmit phase during which it loads configuration data onto the bus at a specific configuration frequency. Configuration data are read in and processed by all slaves 1a, 1b, 1c, 2a, 2b, 2c, 3a, 3b, 3c, 3d connected to bus B', that is all slaves of all groups, independent of whether they belong to an active or an inactive group, such that each slave 1a, 1b, 1c, 2a, 1b, 2c, 3a, 3b, 3c, 3d connected to bus B' can be addressed by master M by means of the communication data transmitted at the communication frequency, wherein the communication data contain information assigning slaves 1a, 1b, 1c to the first group, slaves 2a, 2b, 2c to the second group, and slaves 3a, 3b, 3c, 3d to the third group of slaves.

The configuration data loaded by master M onto Bus" further contain information which assign each slave of each group with at least two communication frequencies. Here, slaves 1a, 2a, 3a are each assigned with two communication frequencies f1 and f2, slaves 1b, 2b, 3b are each assigned with two communication frequencies 13 and f4, slaves 1c, 2c, 3c are each assigned with two communication frequencies f5 and f6, and slave 3d is assigned with communication frequencies f6 and f8.

Table 2 shows the assignment between slaves 1a, 1b, 1c, 2a, 2b, 2c, 3a, 3b, 3c, 3d and communication frequencies f1, f2, f3, f4, f5, f6, f7 and f8:

TABLE 2

| Group | Slave | Communication frequency 1 | Communication frequency 2 |
|---|---|---|---|
| frist group | 1a | f1 | f2 |
|  | 1b | f3 | f4 |
|  | 1c | f5 | f6 |
| second group | 2a | f1 | f2 |
|  | 2b | f3 | f4 |
|  | 2c | f5 | f6 |
| third group | 3a | f1 | f2 |
|  | 3b | f3 | f4 |
|  | 3c | f5 | f6 |
|  | 3d | f7 | f8 |

Here, between the slaves of a group, each slave of said group is assigned with different communication sequences, i.e. between slaves of the same group, no communication sequence is assigned to two different slaves at the same time. Therefore, no communication frequency exists two or more times within one group. However, slaves 1a, 2a, 3a each have the same communication frequencies f1 and f2 assigned. Slaves 1b, 2b, 3b have also assigned the same communication frequencies f3 and f4, and slaves 1c, 2c, 3c have also the same communication frequencies f5 and f6 assigned. Therefore, each communication frequency is present exactly once in each group (table 2).

Communication frequencies f7, f8 are assigned only to slave 3d and to no slave in any other group.

Moreover, the configuration contain further information which switch a group to active, such that the slaves of said group may be addressed at the communication frequencies which have been assigned to the slaves of said group, and switch the other groups inactive, such that said groups are not addressable at communication frequencies.

Each slave of the active group reads in and processes transmit data loaded by master M onto bus B at a frequency corresponding to one of said communication frequencies assigned to said slave. On the other hand, each slave of the active group ignores or discards transmit data loaded by master M onto bus B at a frequency corresponding to a communication frequency assigned to another slave of said group. Similarly, each slave of each inactive group ignores or discards all transmit data loaded by master M onto bus B' at any communication frequency.

The active group is preferably handled as described above with reference to FIGS. 1 and 2, in particular, switching between communication frequencies is performed, if required.

Figure 7:
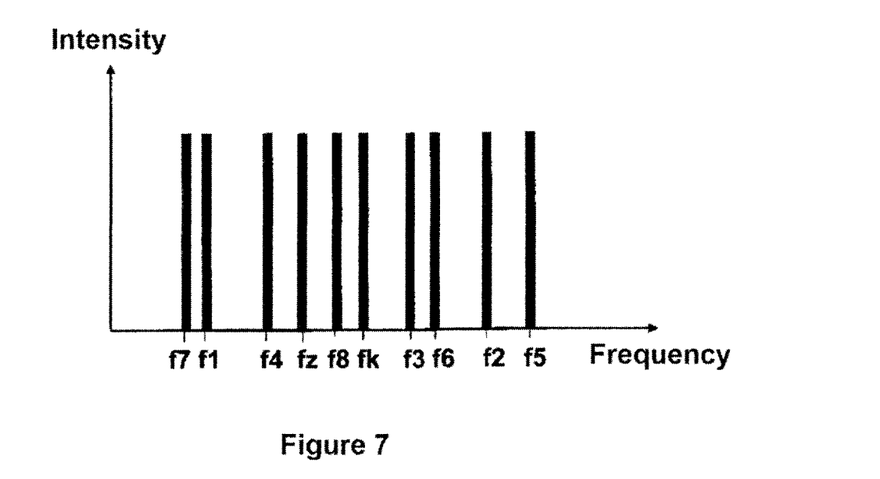
FIG. 7 shows the spectral division of communication frequencies of FIG. 6, wherein an additional configuration frequency is plotted.

FIG. 7 shows an example of the spectral division of communication frequencies f1-f8 assigned to slaves 1a, 1b, 1c, 2a, 2b, 2c, 3a, 3b, 3c, 3d of FIG. 3 in the above manner. Moreover, the configuration frequency fk illustrated above with respect to FIG. 6 is also plotted on the frequency spectrum of FIG. 7.

According to a variant of the present invention, the additional frequency fz illustrated above with reference to FIGS. 1 and 2, is also used for operating the bus system of FIG. 6. According to this variant, the configuration data contain further information which enable the slaves of a group of slaves, e.g. the active group, to read in and process data loaded by master M onto bus B' at the additional frequency, and which affect the slaves of all other groups, e.g. of all inactive groups, such that these slaves will ignore or discard all data loaded by master M onto bus B' at said additional frequency. In this way, data transmitted at said additional frequency may serve to address slaves per groups.

According to another variant, the additional frequency and the configuration frequency are identical to one another, all slaves of all groups being able to be addressed by means of data transmitted at said frequency.

INDUSTRIAL APPLICABILITY

The present invention has industrial applicability, e.g. in the field of process automation, factory automation, control and monitoring of facilities and robotics. The prior art limitation of an As bus system to 4-bit words is overcome. According to the present invention, the word length can be 64 bits. One carrier is able to subsequently address 32 slaves in 4 time groups. 20 Carriers are available for broadcasting, which is a 5-fold redundancy, and 64 carriers are available for one group of slaves, i.e. 2 carriers per slave. This ensures a sufficient redundancy to enable a reliable communication for automation purposes. The communication is performed at frequencies >1 to 7 MHz. At higher frequencies, losses and interferences will increase. For frequencies below 1 MHz conventional AS-i bus systems are used.

LIST OF REFERENCE SIGNS 1a,1b,1c Slaves
2a,2b,2c Slaves
3a,3b,3c,3d Slaves
B Bus
B' Bus
f1, vf2, f3, f4, f5, f6, f7, f8 communication frequencies
fk communication frequency
fz additional frequency
ATK sampling clock correction
BZ bus cycle
DDM differential demodulation DM differential modulation DP downlink phase
DR downlink frame
DS data symbols
DSC descrambler
ES receive signal
FB windowing
FFT Fast-Fourier Transformation,
IFFT inverse Fast-Fourier Transformation
K cable
KC channel encoder
KDC channel decoder
M Master
N power supply
ND payload
NS zero symbol
RB transmission frame
RE frame detection
RS reference symbol
SC Scrambler SNR signal-to-noise ratio
SN RS SNR estimation
SS transmit signal
TR duration
TS learning sequence UP uplink phase
UR uplink frame

I claim:

1. A communication method, in particular for automation purposes, for interchanging data between a master (M) and at least one group of slaves (1a, 1b, 1c, 2a, 2b, 2c, 3a, 3b, 3c, 3d) connected in parallel to said master (M) via a bus (B, B') in a bus system including said master (M), said slaves (1a, 1b, 1c, 2a, 2b, 2c, 3a, 3b, 3c, 3d) and said bus (B, B'), characterized by the following steps:
   a) each slave of said group has at least one communication frequency (f1, f2, f3, f4, f5, f6, f7, f8) assigned thereto,
   b) said master (M) goes through transmit phases during which it loads various transmit data onto said bus (B, B') at different communication frequencies,
   c) each slave of said group
      reads in and processes transmit data loaded by the master (M) onto the bus (B, B') at a frequency which corresponds to the at least one communication frequency assigned to said slave in step a),
      and ignores or discards transmit data loaded by said master (M) onto said bus (B, B') at a frequency which does not correspond to at least one of its assigned communication frequencies, wherein
   f) the master (M) goes through at least one additional transmit phase during which it loads additional transmit data onto said bus (B, B') at at least one additional frequency (fz),
   g) all slaves of said group read in and process said additional transmit data loaded by the master (M) onto said bus (B, B') at said additional frequency (fz) in step f), such that all slaves of said group are able to be addressed y said master (M) by means of said additional transmit data transmitted at said additional frequency (fz) or said additional frequencies, even if step a) has not been carried out, or if said slaves have no communication frequency assigned, wherein
   said additional transmit data contain information which as at least one communication frequency to each slave, such that step a) is executed along with the execution of steps f) and g),
   a1) the master (M) addresses a first slave of said group by transmitting an identifier in the additional data via said bus (B, B') in step f),
   a2) the master (M) performs at least one test communication with the first slave at different test frequencies,
   a3) for each test communication, the associated signal-to-noise ratio or the associated bit error rate is determined,
   a4) between all test frequencies used in step a2), which have not been assigned as communication frequency to a slave, the first slave has the test frequency assigned as communication frequency which achieved the highest signal-to-noise ratio or the lowest bit error rate in step a2,
   a5) steps a1)-a4) are repeated correspondingly for the remaining slaves of said group.

2. A communication method according to claim 1, characterized in that said master (M) loads transmit data onto said bus (B, B') at the same time or in a temporally overlapping manner during transmit phases, and as a result thereof transfers transmit data to all slaves of a group or to a plurality of slaves of a group at the same time or in a temporally overlapping manner.

3. A communication method according to claim 2, characterized by further steps as follows:
   d) each slave of a group goes through output phases during which it loads sets of output data onto said bus (B, B') at at least one frequency corresponding to the at least one communication frequency assigned to said slave in step a),
   e) the master (M) reads in said sets of output data loaded by the slaves of a group onto said bus (B, B') in step d), the master (M) assigning each set of output data by means of its communication frequency to the slave of said group which has been assigned with said communication frequency in step a).

4. Communication method according to claim 3, characterized in that the output phases of all slaves of said group temporally overlap or coincide, such that sets of output data of different slaves of said group are loaded on said bus (B, B') if at different communication frequencies in a temporally overlapping manner or at the same time, and therefore arrive at the master (M) in a temporally overlapping manner or at the same time, wherein said master (M) receives and reads in sets of output data of different slaves of said group at different communication frequencies in a temporally overlapping manner or at the same time in step e) and assigns each read-in set of output data by means of it communication frequency to a specific slave of said group.

5. Communication method according to claim 3, characterized by the following steps:
   h) the master (M) goes through at least one configuration transmit phase during which it loads configuration data onto said bus (B, B') at at least one specific configuration frequency (fk),
   i) each slave (1a, 1b, 1c, 2a, 2b, 2c, 3a, 3b, 3c, 3d) connected to said bus (B, B') reads in and processes the configuration data loaded by the master onto said bus (B, B') in step h), such that each slave connected to said bus (B, B') is able to be addressed by said master (M) by means of said configuration data transmitted at said configuration frequency (fk) or said configuration frequencies, said configuration data including information which
   i1) cancel the assignment between the slaves of said group and said communication frequencies made in step a), if a step a) has already been performed, and i2) assign at least one dedicated communication frequency to each slave of another group of slaves, k) step b) is continued to be performed, l) each slave of the other group reads in and processes transmit data transmitted by the master (M) at a frequency which corresponds to the at least one communication frequency assigned to said slave in step i), and ignores or discards transmit data transmitted by the master at a frequency corresponding to at least one communication frequency assigned to another slave of the other group, and as a result thereof, each slave of the other group is able to be individually addressed by the master (M) by means of transmit data transferred to said slave by the master (M) via the bus (B, B') at at least one communication frequency assigned to said slave, so that the transmit data transfer from master (M) to each slave of the other group takes place at said at least one communication frequency which as been assigned to said slave in step i).

6. Communication method according to claim 1, characterized in that the master loads transmit data onto said bus (B, B') only during transmit phases and receives, reads in and processes sets of output data only during output phases.

7. Communication system according to claim 5, characterized in that m) said master (M) goes through at least one configuration transmit phase during which it loads configuration data onto said bus (B, B') at at least one specific configuration frequency (fk), n) each of said slaves (1a, 1b, 1c, 2a, 2b, 2c, 3a, 3b, 3c, 3d) connected to said bus (B, B') reads in and processes said configuration data loaded by the master (M) onto said bus (B, B') in step m), such that each of said slaves (1a, 1b, 1c, 2a, 2b, 2c, 3a, 3b, 3c, 3d) connected to said bus (B, B') is able to be addressed by said master (M) by means of said configuration data transmitted at said at least one configuration frequency.

8. Communication method according to claim 7, characterized in that said configuration data contain information assigning each slave (1a, 1b, 1c, 2a, 2b, 2c, 3a, 3b, 3c, 3d) to a group of slaves.

9. Communication method according to claim 7, characterized in that the following step is also executed:

o) the master (M) loads communication data onto bus (B, B'), which assign at least one communication frequency to each of said slaves (1a, 1b, 1c, 2a, 2b, 2c, 3a, 3b, 3c, 3d), such that step a) is performed for each group.

10. Communication method according to claim 9, characterized in that the same communication frequency is not assigned to any two slaves of the same group.

11. Communication method according to claim 9, characterized in that the following step is performed:

p) the master (M) loads communication data onto said bus (B, B'), which switch-active one of said groups, such that the slaves of said group are able to be addressed via said communication frequencies assigned to the slaves of said group, and switch-inactive the remaining groups, such that the slaves of said groups are not able to be addressed via communication frequencies.

12. Communication method according to claim 5, characterized in that an AS-i bus system or another type of two-wired bus system is used as said bus system, such that said bus (B, B') serves to transmit not only the data traffic between said master (M) and said slaves of said group, but also to perform the power supply to said master (M) and said slaves connected to said bus (B, B'), wherein it is preferred to use an orthogonal frequency division method (OFDM) or a basic bandwidth discrete multi-tone transmission (DMT) for transmitting signals.

13. Communication method according to claim 12, characterized in that each slave of said group or each slave of at least one group has at least two communication frequencies assigned, the master (M) performs one test communication with each of said slaves of said group at the communication frequency assigned to said slave in certain time intervals in order to determine the signal-to-noise ratio or the bit error rate associated to each communication frequency assigned to said slave, the master (M) then communicates with said slave at the communication frequency for which it has determined the highest signal-to-noise ratio or the lowest bit error rate.

14. A bus system including a master (M) and at least one group of slaves (1a, 1b, 1c, 2a, 2b, 2c, 3a, 3b, 3c, 3d) connected in parallel to said master (M) via a bus (B, B'), characterized in that each slave of said group has or is able to have at least one communication frequency (f1, f2, f3, f4, f5, f6, f7, f8) assigned thereto, said master (M) is able to go through transmit phases during which it loads various transmit data onto said bus (B, B') at different communication frequencies, each slave of said group is able to read in and process transmit data loaded by the master (M) onto the bus (B, B') at a frequency which corresponds to the at least one communication frequency assigned to said slave, and is configured to ignore or discard transmit data loaded by said master (M) onto said bus (B, B') at a frequency which correspond to a communication frequency assigned to another slave of said group, such that each slave of said group is able to be individually addressed by the master (M) by means of transmit data transferred by the master (M) to said slave via said bus (B, B') at at least one communication frequency assigned to said slave, such that the transfer of transmit data from said master (M) to said salve of said group takes place at the at least one communication frequency assigned to said slave, wherein said master (M) is able to go through at least one additional transmit phase during which it loads additional transmit data onto said bus (B, B') at at least one specific additional frequency (fz), each slave of said group is able to individually read in and process said additional transmit data loaded by the master (M) onto said bus (B, B') at said at least one additional frequency (fz), such that each slave of said group is able to be addressed by said master (M) by means of said additional transmit data transferred by said master (M) at said additional frequency (fz) or said additional frequencies, even if said slaves have no communication frequencies assigned, wherein said master (M) is able to assign each slave of said group with at least one communication frequency by loading data as additional transmit data onto said bus (B, B'), which contain information assigning at least one communication frequency to each slave of said group, wherein said assignment of at least one dedicated communication frequency to each slave of said group can be performed as follows:

the master (M) addresses a first slave in said group by means of an identifier included in said additional transmit data via said bus (B, B'), the master performs at least one test communication with said first slave at different test frequencies, a signal-to-noise ratio or a bit error rate associated with each test communication is determined, between all test frequencies used in this process, which have not been assigned as a communication frequency to a slave, the test frequency which helped to achieve the highest signal-to-noise ratio or the lowest bit frequency is assigned to said slave, this procedure is repeated for accordingly for the other slaves of said group.

15. Bus system according to claim 14, characterized in that the same communication frequency is not assigned to two slaves of the same group.

16. Bus system according to claim 14, characterized in that said master (M) is able to load transmit data onto said bus (B, B') during said transmit phases at the same time or in a temporally overlapping manner at different communication frequencies and to transfer transmit data to a plurality of slaves of said group at the same time or in a temporally overlapping manner.

17. Bus system according to claim 14, characterized in that each slave of a group is able to go through output phases during which it loads sets of output data onto said bus (B, B') at at least one frequency which corresponds to the at least one frequency assigned to said slave, and the master (M) is able to read in said sets of output data loaded onto said bus by said slaves, and to assign each set of output data by means of said at least communication frequency to the slave of said group which has said at least one communication frequency assigned.

18. Bus system according to claim 17, characterized in that the output phases of all slaves of said group are temporally overlapping or coinciding, such that sets of output data from different slaves of said group arrive at said bus (B, B') at different communication frequencies in a temporally overlapping or coinciding manner, wherein said master (M) is able to receive and read in sets of output data from different slaves of said group at different communication frequencies in a temporally overlapping manner or at the same time, and to assign each set of output data to a specific slave of said group by means of said communication frequency.

19. Bus system according to claim 14, characterized in that said master (M) transfers transmit data only during said transmit phases and receives, reads in and processes sets of output data only during said output phases.

20. Bus system according to claim 19, characterized in that the following steps may be performed:

h) the master (M) goes through at least one configuration transmit phase during which it loads configuration data onto said bus (B, B') at at least one specific configuration frequency, i) each slave connected to said bus (B, B') reads in and processes said communication data loaded by said master (M) onto said bus (B, B') in step h), such that each slave connected to said bus (B, B') is able to be addressed by the master (M) by means of the configuration data transferred at said communication frequency (fk) or communication frequencies, said configuration frequencies containing information which i1) cancel the assignment between the slaves of said group and said communication frequencies made in step a), if said step a) has already been performed, and i2) assign at least one communication frequency to each slave of a different group of slaves, k) step b) is continued to be executed, l) each slave of said different group reads in and processes transmit data transferred by the master at a frequency corresponding to said at least one communication frequency assigned to said slave in step i), and ignores or discards transmit data which are transferred by said master (M) at a frequency corresponding to the at least one communication frequency assigned to another salve of said different group, such that each slave of said different group is individually addressable by said master (M) by transmit data transferred by said master (M) to said slave via said bus (B, B') at at least one communication frequency assigned to said salve, such that the transfer of transmit data from the master of each slave of said different group is carried out at said at least one communication frequency assigned to said slave in step i).

21. Bus system according to claim 20, characterized in that m) said master (M) is able to go through at least one configuration transmit phase during which it loads configuration data onto said bus (B, B') at at least one specific configuration frequency (fk), n) each slave (1a, 1b, 1c, 2a, 2b, 2c, 3a, 3b, 3c, 3d) connected to said bus (B, B') is able to individually read in and process said configuration data transferred by the master (M) onto said bus (B, B') in step m, such that each slave (1a, 1b, 1c, 2a, 2b, 2c, 3a, 3b, 3c, 3d) connected to said bus (B, B') is able to be addressed by the master (M) by means of said configuration data transferred at said at least one configuration frequency.

22. Bus system according to claim 21, characterized in that said configuration data contain information which assign each slave (1a, 1b, 2c, 2a, 2b, 2c, 3a, 3b, 3c, 3d) to a group of slaves.

23. Bus system according to claim 21, characterized in that said master (M) is able to load configuration data onto said bus (B, B') which assign at least one communication frequency to each slave (1a, 1b, 1c, 2a, 2b, 2c, 3a, 3b, 3c, 3d) of each group.

24. Bus system according to claim 23, characterized in that the same communication frequency is not assigned to two slaves of the same group.

25. Bus system according to claim 23, characterized in that said master (M) is able to load configuration data onto said bus (B, B') which switch active one of said groups, such that the slaves of said group are able to be addressed via said communication frequencies assigned to the slaves of said group, and switch inactive the other groups, such that the slaves of said groups are not able to be addressed via communication frequencies.

26. Bus system according to claim 23, characterized in that said bus system is an AS-i bus system or a different type of two-wired bus system, such that via said bus (B, B') not only the data traffic between said master (M) and said slaves is performed, but also the power supply to said master (M) and said slaves connected to said bus (B, B') is performed, wherein it is preferred to provide an OFDM carrier or its basic variant, a DMT carrier for signal transmission.

27. Bus system according claim 14, characterized in that each slave of said group or each slave of at least one group has at least two communication frequencies assigned thereto, the master (M) is able to carry out one test communication with said salve at each communication frequency assigned to said slaves in order to be able to determine the signal-to-noise ratio or the bit error rate associated with each communication frequency assigned to said slave, said master (M) is able to then communicate with said slave at the communication frequency for which the highest signal-to-noise ratio or the lowest bit error rate has been determined.

\* \* \* \* \*